Nov. 11, 1941.  J. R. WHITTLES  2,262,126

GRINDING MACHINE TABLE TRAVERSE MECHANISM

Filed April 20, 1939  5 Sheets-Sheet 1

Inventor
JOSEPH R. WHITTLES
By Harold W. Eaton
Attorney

Nov. 11, 1941.  J. R. WHITTLES  2,262,126
GRINDING MACHINE TABLE TRAVERSE MECHANISM
Filed April 20, 1939  5 Sheets-Sheet 2

Inventor
JOSEPH R. WHITTLES
By Harold W. Eaton
Attorney

Nov. 11, 1941.  J. R. WHITTLES  2,262,126
GRINDING MACHINE TABLE TRAVERSE MECHANISM
Filed April 20, 1939   5 Sheets-Sheet 3
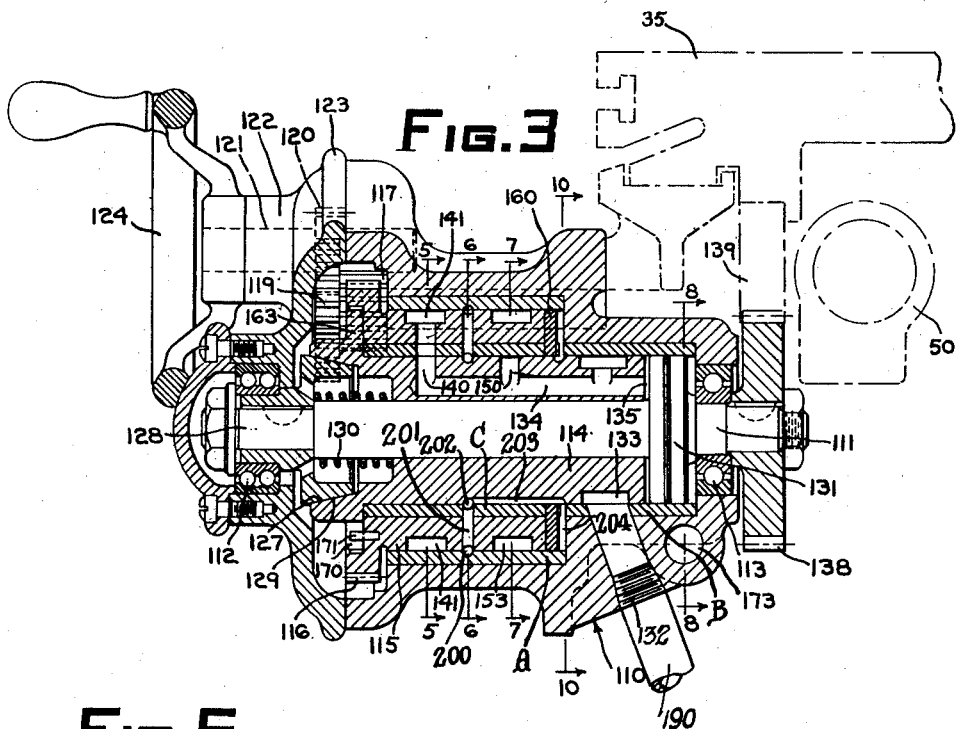
Inventor
JOSEPH R. WHITTLES
By Harold W. Eaton
Attorney

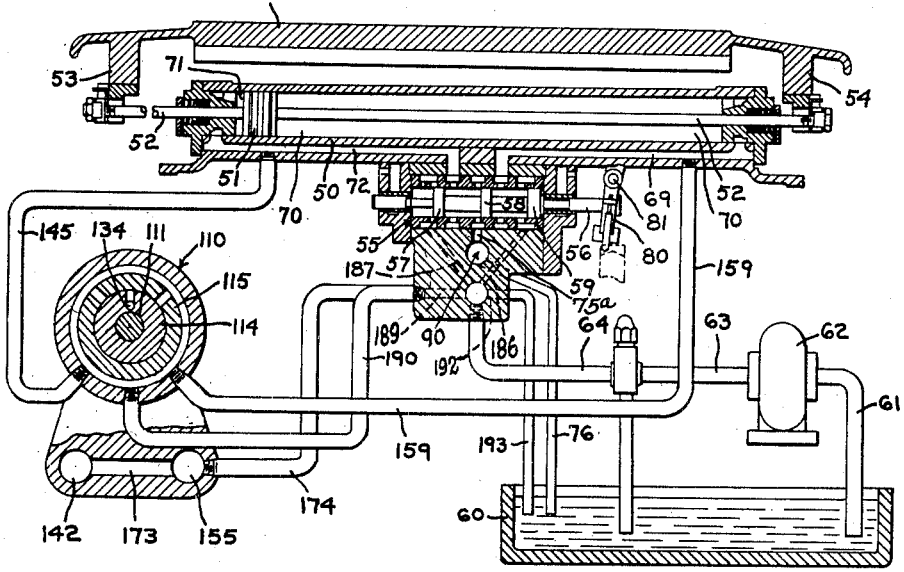
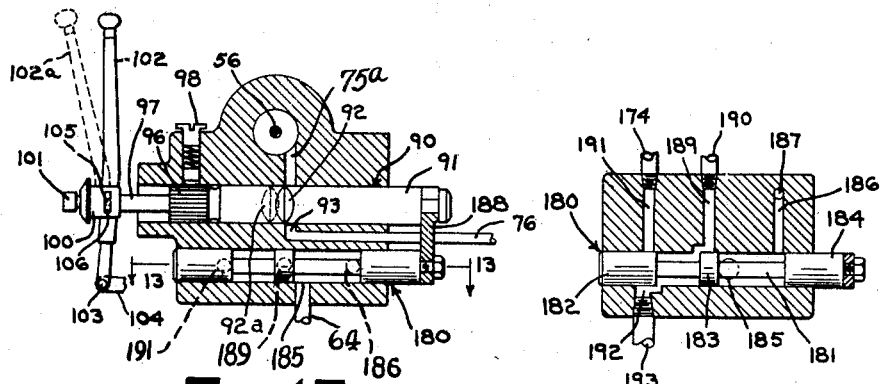
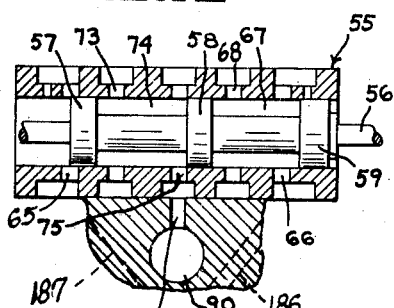

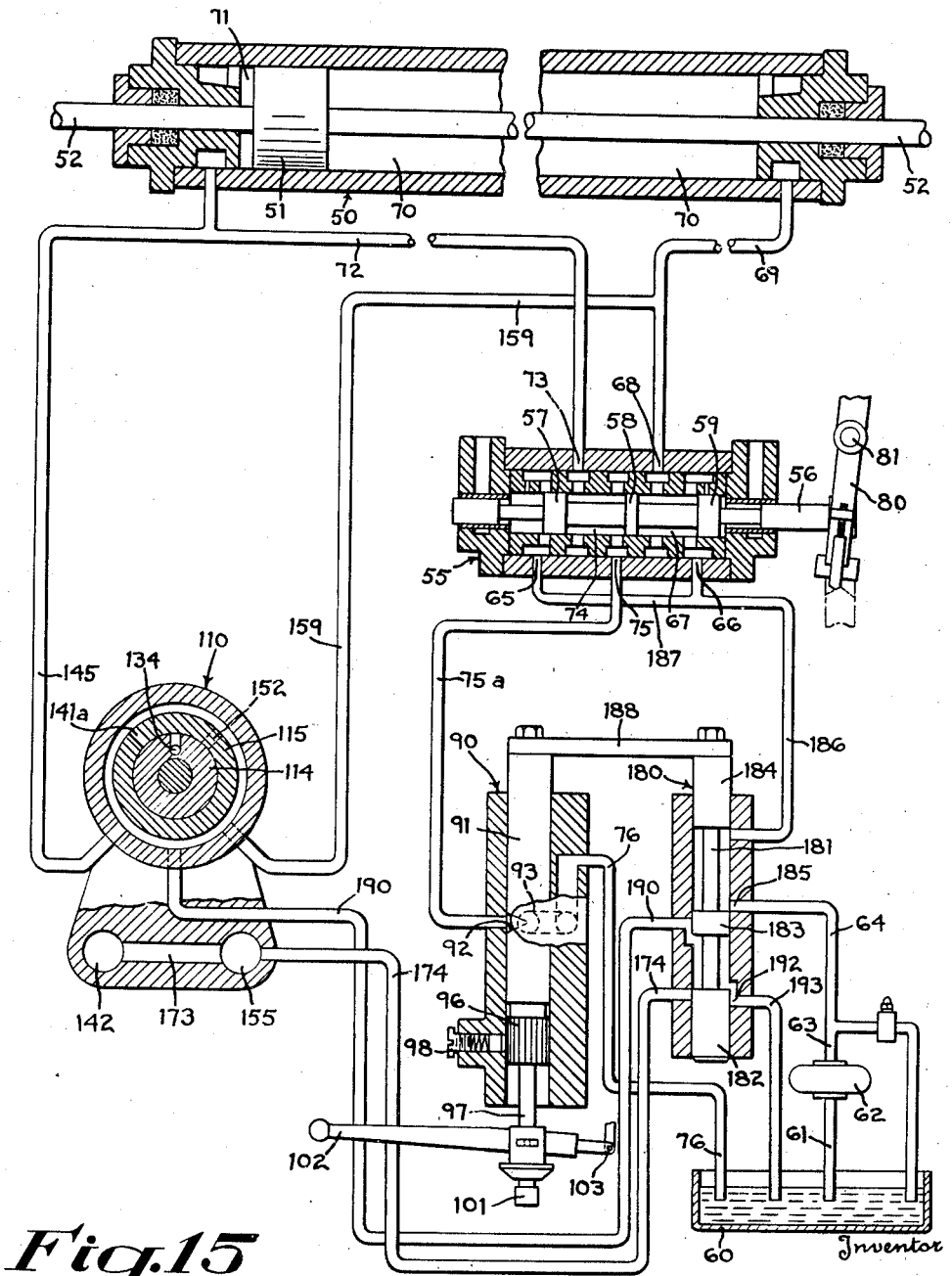

Patented Nov. 11, 1941

2,262,126

UNITED STATES PATENT OFFICE 2,262,126

GRINDING MACHINE TABLE TRAVERSE MECHANISM

Joseph R. Whittles, Holden, Mass., assignor to Norton Company, Worcester, Mass., a corporation of Massachusetts Application April 20, 1939, Serial No. 268,870

6 Claims. (Cl. 60—52)

The invention relates to grinding machines, and more particularly to a manually actuated and controlled hydraulic table traversing mechanism therefor.

One object of the invention is to provide a simple and thoroughly practical grinding machine table traversing mechanism. Another object of the invention is to provide a manually controlled table traverse mechanism by which the table may be traversed easily without undue exertion on the part of the operator. Another object of the invention is to provide a manually controlled hydraulically operated table traversing mechanism. Another object of the invention is to provide a manually controlled hydraulically actuated table traversing mechanism in which the speed of movement of the control member, such as the rotation of a hand wheel, serves to control the rate of traversing movement of the table. A further object of the invention is to provide a manually operable hydraulic traverse mechanism which is so arranged and constructed that rotation of the manually operable table traverse wheel serves to actuate and control the position of a hydraulic control valve to control the speed of the traversing movement of the table. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of the invention, Fig. 1 is a front elevation of a grinding machine embodying this invention;

Fig. 3 is a fragmentary vertical sectional view, taken approximately on the line 3—3 of Fig. 2, showing the manually operable control valve for the traverse mechanism;

Fig. 4 is a fragmentary piping diagram of the fluid pressure system for manually traversing and automatically reciprocating the grinding machine table;

Fig. 5 is a fragmentary sectional view, taken approximately on the line 5—5 of Fig. 3, showing the valve parts for admitting fluid to the left-hand end chamber of the table cylinder;

Fig. 7 is a fragmentary sectional view taken approximately on the line 7—7 of Fig. 3, showing the valve parts for controlling the admission of fluid to the right-hand end cylinder chambers;

Fig. 8 is a fragmentary sectional view, taken approximately on the line 8—8 of Fig. 3, showing the exhaust passage of the manual control valve unit;

Fig. 12 is a fragmentary vertical sectional view through the stop and start valve;

Fig. 13 is a fragmentary sectional view, taken approximately on the line 13—13 of Fig. 12, showing the valve for controlling the admission of fluid to and from the table traversing mechanism;

Fig. 14 is a fragmentary sectional view, on an enlarged scale, through the table control valve; and Fig. 15 is a diagrammatic illustration of the hydraulic control system.

Figure 1:
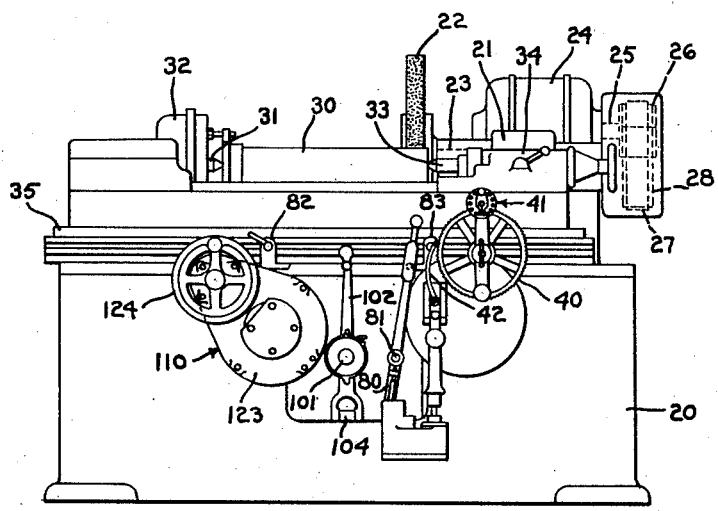

A cylindrical grinding machine has been illustrated in the drawings having a base 20 which is provided with a transversely movable wheel slide 21 which is movable transversely on the usual V-way and flat way (not shown). A rotatable grinding wheel 22 is mounted on a wheel spindle 23 which is supported for rotation in bearings (not shown) on the wheel slide 21. The grinding wheel 22 may be rotated by any suitable source of power either by means of a driving belt from an overhead countershaft, or it may be driven by an electric motor 24 mounted on the wheel slide 21. The motor 24 is provided with an armature shaft 25 which supports a pulley 26. The pulley 26 is connected by a driving belt 27 with a pulley 28 mounted on the outer end of the wheel spindle 23.

A work piece 30 is rotatably supported on a headstock center 31 carried by a headstock 32. The other end of the work piece 30 is supported by a footstock center 33 carried by a footstock 34. The headstock 32 and footstock 34 are mounted on a longitudinally reciprocable table 35 which slides longitudinally on a flat way and a V-way (not shown) on the base 20.

The grinding wheel slide 21 is arranged for a transverse feeding movement to cause the grinding wheel 22 to approach or recede from the work piece 30 so as to grind the same to the desired extent. A wheel feeding mechanism is provided comprising the well known half nut and rotatable cross feed screw (not shown) which are actuated by a manually operable feed wheel 40 which is rotatably supported on the front of the machine base. The feeding wheel 40 is provided with a micrometer adjusting mechanism 41, and is arranged to be rotated either manually or automatically by means of a reciprocable picker or ratchet pawl 42. The details of the grinding wheel feeding mechanism have not been illustrated in the present case, since they are not considered to be a part of the present invention. The wheel feeding mechanism utilized is a well known wheel feeding mechanism such as, for example, that shown in the prior U. S. patent to C. H. Norton No. 762,838 dated June 14, 1904. For further details of the wheel feeding mechanism, reference may be had to the above-mentioned patent.

In a cylinder grinding machine, it is desirable to provide a power operated traversing or reciprocating mechanism to cause a relative longitudinal traversing movement between the rotatable work piece 30 and the rotatable grinding wheel 22 so as to grind the work piece to the required cylindrical form. A fluid pressure operated traversing mechanism is provided comprising a fluid pressure cylinder 50 which is fixedly mounted to the base 20 of the machine. A piston 51 is slidably mounted within the cylinder 50 and is provided with a double end piston rod 52 which extends through the opposite ends of the cylinder 50 and is fastened to brackets 53 and 54 which depend from the opposite ends of the longitudinally movable work supporting table 35. The brackets 53 and 54 are either formed integral therewith or rigidly fixed to the under side of the table 35. A control or reversing valve 55 is provided to control the direction of movement of the piston 51 and the table 35. The valve 55 is preferably of a piston type comprising a valve stem 56 having valve pistons 57, 58 and 59 integrally formed therewith.

A fluid reservoir 60 is located preferably within the base 20 of the machine. Fluid is pumped from the reservoir 60, through a pipe 61, by means of a motor driven fluid pressure pump 62, and is forced through a pipe 63, a pipe 64, a pipe 186, and through port 66, respectively, in the control valve 55. As shown in the position of the parts illustrated in Fig. 15, fluid under pressure passing through the pipe 64, the pipes or passages 186 and 187, and the port 66 enters a valve chamber 67 located between the valve pistons 58 and 59 and passes outwardly through a port 68 and a pipe or passage 69 into a cylinder chamber 70 to cause the piston 51 and table 35 to move in a direction toward the left (Figs. 1 and 15). During the movement of the piston 51 and the table 35 toward the left, fluid is exhausted from a cylinder chamber 71, through a pipe or passage 72, a port 73, into a valve chamber 74 located between the valve pistons 57 and 58, and passes out through an exhaust port 75, through a pipe or passage 75a and a pipe 76, into the reservoir 60. When it is desired to reverse the direction of movement of the table 35, the valve stem 56 is moved toward the left (Fig. 1) so as to reverse the flow of fluid pressure to and from the cylinder 50. In this position of the valve, fluid under pressure passing through the pipe 63, the pipes 64 and 186, and the port 65 enters the valve chamber 74 between the valve pistons 57 and 58 and passes outwardly through the port 73, the pipe 72, into the cylinder chamber 71, to move the piston 51 and table 35 toward the right, as viewed in Fig. 1. During this movement of the table, fluid within the cylinder chamber 70 is exhausted through the pipe or passage 69, the port 68, into the valve chamber 67, and out through the port 75, the pipe or passage 75a, and the pipe 76, into the reservoir 60.

The reverse or control valve 55 is preferably actuated automatically in timed relation with the movement of the work table 35. A reversing lever 80 is pivotally mounted on a stud 81 and its upper end is arranged in the path of adjustable dogs 82 and 83 carried by the table 35. The reversing lever 80 is operatively connected to shift the reversing valve 55 in the desired timed relationship with the reciprocation of the table 35. In order to control the speed or rate of movement and to start and stop the movement of the reciprocable work table 35, a combined speed control and start and stop valve 90 is provided. The valve 90 is preferably arranged in the exhaust side of the fluid pressure system so that fluid under pressure exhausting from the cylinder 50 is throttled to control the speed of movement of the table 35. The valve 90 is preferably of a piston type having a slidably mounted piston 91 within the valve casing 90. The valve piston 91 is provided with a V-shaped passage or groove 92 which is arranged to open or close a port 93 in the exhaust pipe 76 so as to stop or start the flow of fluid in the table traversing mechanism or, when rotated in an open position, the V-shaped passage 92 serves to vary the size of the aperture between the V-shaped passage 92 and the port 93 so that the traversing speed of the table 35 may be readily varied as desired. In the full-line position (Fig. 12), the valve piston 91 is in an operating position, with the port 93 partially uncovered.

A serrated portion 96 formed on the valve stem 97 cooperates with a spring-pressed plunger 98 to maintain the valve piston 91 in the desired rotary position. Due to the fact that the grooves of the serrated portion are arranged parallel to the axis of the valve, the valve piston 91 may be moved endwise from a stop to a start or from a start to a stop position without changing the rotary position of the V-shaped groove 92 of the piston 91. The valve stem 97 is journalled in a bearing block 100 and a manually operable control knob 101 is mounted on the outer end of the valve stem 97 to facilitate a rotary adjustment of the valve to produce the desired speed.

In order to move the valve piston 91 from a start to a stop or from a stop to a start position, a manually operable control lever 102 is pivotally mounted on a stud 103 supported in a bracket 104 projecting from the front of the machine base 20. The lever 102 is provided with diametrically opposed pins 105 which ride in slots 106 on opposite sides of the bearing member 100 (only one of the pins and slots being shown in the drawings). The pins 105 and slots 106 facilitate endwise movement of the valve piston 91 and also permit a rotary adjustment of the piston 91 to control the speed of movement of the table 35. To stop the exhaust of fluid from the system so as to stop the movement of the table 35, the manually operable control lever 102 is moved into a position 102a (Fig. 12) which shifts the control valve piston 91 so that the V-shaped groove 92 is in position 92a, thereby closing the port 93 and preventing further exhaust of fluid from the system.

To attain the main object of the invention, a manually controlled table traversing mechanism is provided whereby the table 35 may be traversed longitudinally without undue effort on the part of the operator. A manually controlled hydraulically actuated table traversing mechanism is provided in which the speed of movement of a control member, such as the rotation of a manually operable hand traverse wheel, serves to control the rate of traversing movement of the table 35.

As illustrated in the drawings, a manually operable hydraulic traverse control apron 110 is mounted on the front of the machine base 20. The traverse apron 110 is provided with a rotatable shaft 111 which is journalled in bearings 112 and 113 within the apron 110. The shaft 111 serves as a support for a rotatable valve member 114. A rotary valve member 115 surrounds the valve member 114 and is rotatably supported thereon. In order to provide an accurate bearing support for the rotatable valve member 115, a bushing or sleeve A is fixedly supported in the casing or apron 110. The rotatable valve member 114 is supported by a bushing or sleeve B which is fixedly mounted in the casing or apron 110 and a bushing C which is fixedly mounted within a central aperture in the rotatable valve member 115. A gear 116 is formed integral with the outer rotary valve member 115. The gear 116 meshes with a gear 117 rotatably supported on a stud 118. A gear 119 is either formed integral with or fixedly mounted to rotate with the gear 117. The gear 119 meshes with a gear or pinion 120 which is supported on the inner end of a rotatable shaft 121. The shaft 121 is journalled in a bearing 122 formed in a cover plate 123 on the front of the apron 110. A manually operable traverse control wheel 124 is fixedly mounted on the outer end of the shaft 121.

The shaft 111 is preferably arranged so that it may be clutched to rotate with the rotary valve member 114 or may be declutched therefrom and rotated continuously while the valve member 114 remains stationary. A cone-shaped clutch member 127 is keyed to a reduced end portion 128 of the shaft 111. An internal frusto-conical clutch member 129 is formed integral with the rotary valve member 114. A compression spring 130 surrounding the shaft 111 and interposed between the clutch member 127 and a recessed portion of the valve member 114 serves normally to hold the clutch parts disengaged. The rotary valve member 114 is arranged so that it may have an endwise or axial motion sufficient to engage or disengage the clutch.

In order to engage the clutch member 129 with the clutch member 127, a fluid pressure mechanism is provided. A fluid pressure operated piston 131, which is slidably mounted within the sleeve or bushing "B," is formed integral with the rotatable shaft 111. When fluid under pressure is admitted through a pipe 190 and an intake port 132 to the valve apron, it passes around an annular groove 133 surrounding the periphery of the rotary valve member 114 and passes through a radially extending passage into a longitudinally extending passage 134 which is formed within the valve member 114 and extends in a direction substantially parallel to the axis of rotation thereof. Fluid under pressure within the passage 134 enters a cylinder chamber 135 formed between the piston 131 and the right-hand end face of the valve member 114 (Fig. 3), which pressure serves to move the rotary valve member 114 towards the left (Fig. 3) against the compression of the spring 130 so that the clutch member 129 drivingly engages the clutch member 127. When fluid under pressure is cut off from the port 132 in the valve apron 110, the released compression of the spring 130 moves the valve member 114 toward the right (Fig. 3) a sufficient distance to disengage the clutch member 129 from the clutch member 127.

The port at the end of the passage 189 in valve 180 is elongated (Fig. 13) and the port 192 is similarly elongated so that in the position of the valve 180, as shown in Fig. 13, that is, when the valve 180 is positioned for a hydraulic power traversing movement of the table, fluid may exhaust through the pipe 190 into the valve chamber located between the valve pistons 182 and 183 and pass outwardly through pipe 193 into the reservoir 60. The exhausting of fluid through the pipe 190 combined with the released compression of the spring 130 serves to cause the piston 114 to move toward the right (Fig. 3) to disengage the clutch surfaces 127—129.

The inner end or right-hand end (Fig. 3) of the shaft 111 is provided with a gear 138 which is keyed thereto and meshes with a rack bar 139 depending from the under side of the table 35. When the table 35 is reciprocated longitudinally by means of the fluid pressure piston 51 and cylinder 50, the clutch 127—129 is disengaged, thus allowing the gear 138 and shaft 111 to rotate through the rack bar 139 without rotatably shifting the position of the valve 114.

Fluid under pressure entering the longitudinally extending passage 134 in the valve member 114 may pass outwardly in a radial direction through a radially extending passage 140. The valve member 114 is rotated in a counterclockwise direction (Fig. 5) until the V-port 140a uncovers a port or passage 141a within the rotary valve member 115 so as to admit fluid under pressure to an annular groove 141 formed in the outer periphery of the valve member 115. The annular groove 141 is arranged to admit fluid through a radially extending passage 142a into a longitudinally extending passage 142 (Fig. 5) which passes fluid under pressure to open a valve 143 against the compression of a spring 143a so as to pass fluid under pressure through a port 144 and a pipe 145 to pipe 72 and thence to the cylinder chamber 71 formed between the left-hand end of the cylinder 50 and the piston 51.

Similarly, fluid within the passage 134 may pass through a radially extending passage 150 within the valve member 114. The valve member 114 is rotated in a clockwise direction (Fig. 7) until the V-port 151 uncovers a port or passage 152 within the rotary valve member 115 so as to admit fluid under pressure to an annular groove 153 formed in the outer periphery of the valve member 115. The annular groove 153 is arranged to admit fluid through a radially extending passage 154 into a longitudinally extending passage 155 (Fig. 7) which passes fluid under pressure to open a valve 156 against the compression of a spring 157 so as to pass fluid under pressure through a port 158 and a pipe 159 to pipe 69 and thence to the cylinder chamber 70 formed between the right-hand cylinder head of the cylinder 50 and the piston 51.

Figure 10:
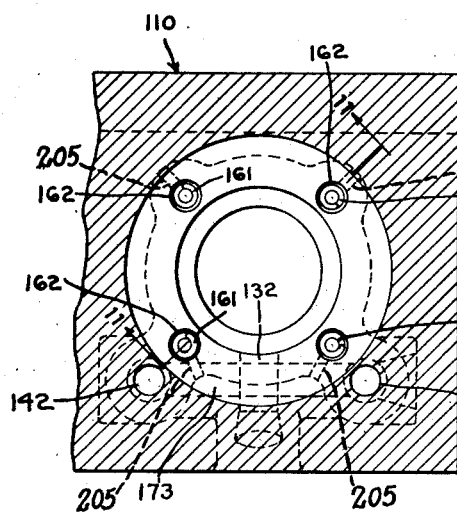
Fig. 10 is a fragmentary sectional view, taken approximately on the line 10—10 of Fig. 3, showing the end thrust for the manually operable control valve.
Figure 11:
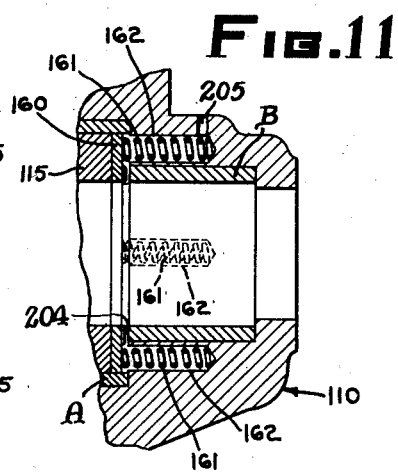
Fig. 11 is a fragmentary sectional view, taken approximately on the line 11—11 of Fig. 10.

In order to maintain the valve members 114 and 115 in proper timed relationship with each other during hydraulic reciprocation of the table 35 when clutch means 127, 129 are disengaged, the inner rotary valve member 114 is held against rotation relative to the outer rotary valve member 115 during the hydraulic reciprocation of the table 35. This is preferably accomplished by an end thrust washer 160 and a plurality, namely four, of symmetrically arranged springs 161 (Figs. 10 and 11) which are supported in apertures 162 within the table traverse apron 110 and which are arranged to exert an endwise pressure toward the left (Fig. 3) on the outer rotary valve member 115 so that the left-hand recessed end face of the valve member 115 frictionally engages the right-hand end face of a flange 163 formed integral with the inner rotary valve member 114, so that if the manually operable hand wheel 124 is accidentally rotated while the table 35 is being reciprocated by the power operated fluid pressure mechanism, the rotary valve members 114 and 115 will be maintained in timed relationship with each other. The compression of the springs 161 is somewhat less than the compression of the spring 130, so that the rotatable valve members 114 and 115 may be held frictionally in a predetermined relationship with each other while at the same time the compression of the spring 130 holds the clutch means 127, 129 disengaged.

It will be readily apparent from the foregoing disclosure that with a single passage through the valve member 115 to each of the peripheral grooves 141 and 153, it will only be necessary to rotate the valve member one-third of one complete rotation or less before the inlet of fluid pressure is conveyed to start the table movement in either direction. As previously described, the compression springs 161 bearing against the thrust washer 160 normally tend to hold the valve member 115 in frictional engagement with the valve member 114 during the hydraulic traverse of the table so that these two rotary valve parts are maintained in the operating position shown in Figs. 5 and 7 with the V-ports 140a and 151 located substantially midway between the radial passages 141a and 152 so that only a slight motion of the valve member 115 by means of the manual traverse wheel will uncover either the V-port 140a (Fig. 5) or the V-port 151 (Fig. 7) depending upon the direction of rotation of the hand traverse control wheel 124.

It is desirable to connect the manual traverse wheel 124 with the rotary valve member 115 in such a manner that the table will be traversed in a direction determined by the direction of rotation of the hand wheel. Consequently, the intermediate gears 119—117 are provided so that the rotary valve member 115 is rotated in the same direction as the manually operable traverse wheel 124.

The flange 163 which is formed integral with the inner rotary valve member 114 is provided with a cut-out sector 170 which is substantially a ninety degree sector. The outer rotary valve member 115 which is recessed at its left-hand end (Fig. 3) to receive the flange 163 of the valve member 114 is provided with a fixed pin or stud 171 phich projects therefrom and is arranged to be engaged by the ends of the cut-out sector 170 of the flange 163, thus forming a further safety device to prevent the valve member 115 from moving more than a slight distance in either direction relative to the outer valve member 115.

Figure 9:
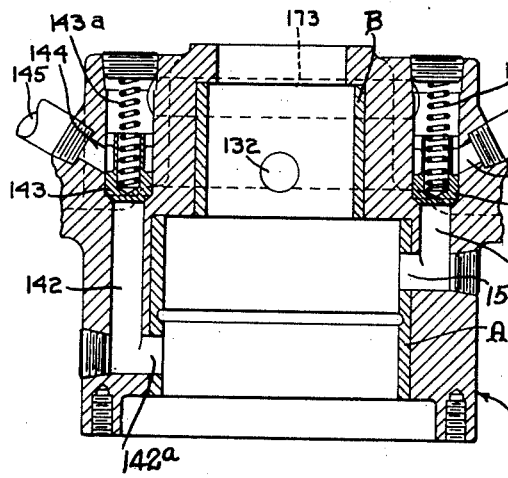
Fig. 9 is a fragmentary sectional view, taken approximately on the line 9—9—9 of Fig. 2, showing the ports and valves for controlling the flow of fluid to the table traversing cylinder.
Figure 6:
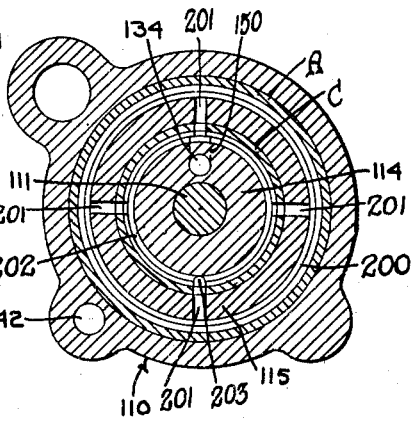
Fig. 6 is a fragmentary sectional view, taken approximately on the line 6—6 of Fig. 3.
Figure 2:
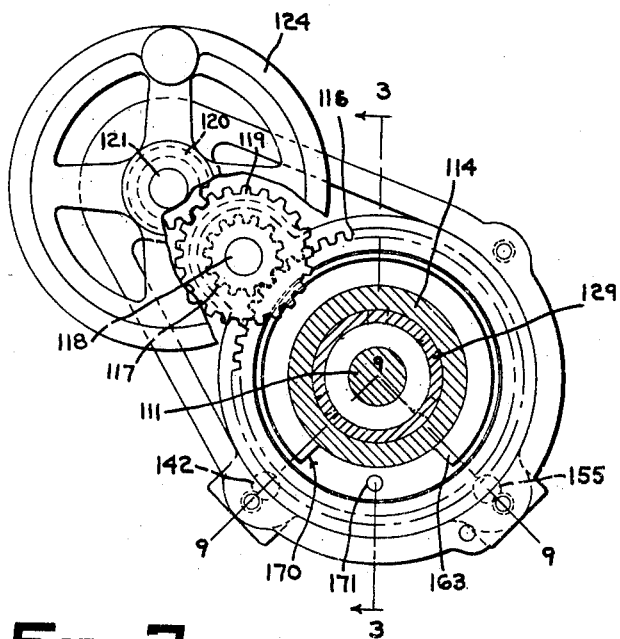
Fig. 2 is a fragmentary front elevation, on an enlarged scale, of the manual table traverse apron, having parts broken away to more clearly show the operating construction.

The longitudinally extending passages 142 and 155 which are connected by means of the pipes 145 and 159, respectively, with the left-hand cylinder chamber and right-hand cylinder chamber of the cylinder 50, respectively, are enlarged bores arranged to receive the spring actuated valves 143 and 156. The two enlarged bores (Fig. 9) containing the valve members 143 and 156 are interconnected by means of an exhaust passage 173. It will be readily apparent from the foregoing disclosure that fluid exhausting from either of the cylinder chambers through the passage 142 or 155 and the exhaust passage 173 exhausts through a pipe 174, through a control valve to be hereinafter described, to the reservoir 60. When either the valve 143 or the valve 156 is opened to admit fluid under pressure through the pipes 145 or 159 to the respective cylinder chambers, fluid cannot by-pass into the exhaust due to the fact that the valve member cuts off the passage of fluid through the exhaust pipe.

A control valve 180 is provided for controlling the admission of fluid under pressure to either the hydraulic table reciprocating mechanism or to the hand traverse mechanism. This valve is preferably a piston type valve comprising a valve stem 181 having a plurality of valve pistons 182, 183 and 184 formed integrally therewith. Fluid under pressure is admitted through the pipe 64 and a port 185 into a valve chamber formed between the valve pistons 183 and 184. In the position of the valve 180 (Fig. 13), fluid under pressure passes out through a passage 186 and a passage 187 to the reversing or control valve 55 to admit fluid under pressure to either end of the cylinder 50 as controlled by the reversing or control valve 55 automatically to reciprocate the table through a predetermined stroke.

The valve 180 is preferably moved in timed relation with the stop and start valve 90. As illustrated in the drawings, a link 188 is connected between the right-hand ends of the valves 90 and 180 (Fig. 12) so that when the stop and start valve 90 is moved to either stop or start the hydraulic reciprocation of the table, the control valve 180 is moved therewith to admit fluid under pressure either to the table reciprocating mechanism or to the hand traversing mechanism.

In the position of the parts as illustrated in Figs. 12 and 13, fluid under pressure is admitted to the hydraulic table reciprocating mechanism. When it is desired to traverse the table by hand, the stop and start valve 90 is shifted toward the left (Fig. 12) which serves to cut off the port 93 to stop the exhaust of fluid from the table cylinder 50. At the same time, the valves 90 and 180 move toward the left (Figs. 12 and 13), during which movement the valve piston 184 covers the pressure port 186 to cut off fluid pressure from the control valve 55 and cylinder 50. As the piston 183 moves toward the left, fluid under pressure passing through the port 185 into the valve chamber between valve pistons 183 and 184 passes out through a passage 189 and a pipe 190 to the manual traverse control valve 110. At the same time, the valve piston 182 moves toward the left so that fluid exhausting through the pipe 174 may pass through a passage 191 into a valve chamber located between the valve pistons 182 and 183 and out through a port 192 and a pipe 193 which exhaust fluid into the reservoir 60.

It will thus be seen that the control valve 180 operated by and in timed relation with the stop and start valve 90 serves to admit fluid either to the table reciprocating control valve 55 in the position of the parts (Figs. 12 and 13), or when the valve 90 is shifted toward the left carrying with it the valve 180, fluid under pressure is cut off from the hydraulic reciprocating control valve 55 and admitted to the manually operable traverse control valve 110. By means of this interlocked mechanism, fluid under pressure is cut off from the manual traverse control valve 110 when fluid is admitted to the table reciprocating control valve 55 and vice versa when fluid is cut off from the table traverse control valve 56 to stop the hydraulic reciprocation of the table, the manually operable traverse valve 110 is rendered operative.

In order to drain any oil which seeps by the parts of the valve, an oil groove 200 is formed between the bushing A and the rotary valve member 115. This oil groove is connected by four radially extending passages 201 with an oil groove 202 formed between the bushing C and the rotatable valve member 114. The groove 202 is connected by a longitudinally extending passage 203 (Fig. 3) which connects with a chamber 204 formed between the thrust collar 160 and the apron housing 110. Oil accumulated within the chamber 204 may pass longitudinally through the four holes 162 which support the springs 161 and pass outwardly through drainage holes 205 formed in the apron housing 110. Any oil draining through the passage 205 returns to the reservoir in the machine. The provision of this oil drainage passage prevents any oil leakage from being trapped within the chamber 204 and thus interfering with the action of the friction device and actuation of the clutch parts.

The operation of this mechanism is readily apparent from the foregoing disclosure. Assuming the parts to have been previously adjusted a work piece is placed in position in the machine. If it is desired to grind by automatic power traverse of the table, the valves 90 and 180 are shifted into the position illustrated in Figs. 12 and 13 so that fluid under pressure is admitted to and permitted to exhaust from the table actuated reversing or control valve 55 to reciprocate the work table 35 through the desired table stroke. If it is desired to traverse the table under manual control, the lever 102 is shifted into dotted line position 102a to shift the stop and start valve 90 together with the control valve 180 toward the left (Figs. 12 and 13) so as to cut off fluid under pressure from the table reciprocating valve 55 to admit fluid under pressure through the pipe 190 to the manual traverse control valve 110.

When fluid under pressure is cut off from the table control valve 55 and admitted through the port 132 into the annular groove 133 and from there into the longitudinally extending passage 134, the pressure within these passages, acting upon the stationary piston 131, produces an endwise movement of the inner valve member 114 toward the left (Fig. 3) which serves to move the clutch member 129 into engagement with the clutch member 127 against the compression of the spring 130, so that when the gear 138 is rotated by the table rack 139, this rotary motion will be transmitted through the shaft 111, the clutch members 127—129, to rotate the inner rotary valve member 114.

Similarly, when the stop and start valve 90 and the control valve 180 are moved into the positions indicated in Figs. 12 and 13, thereby cutting off fluid under pressure from the port 132, the released compression of the spring 130 serves to move the inner valve member 114 toward the right (Fig. 3) a short distance so as to disengage the clutch member 129 from the clutch member 127 so that the gear 138 and shaft 111 are free to rotate with the rack bar 139 during the automatic reciprocation of the table without shifting the valve parts.

Due to the compression springs 161 holding the outer valve member 115 in frictional engagement with the flange 163 of the inner valve member, any rotary motion of the manually operable traverse wheel 124, with clutch 127, 129 disengaged will rotate the rotary valves 114 and 115 together so that the relative positions of the V-ports 140a and 151a relative to the passages 141a and 152 will remain the same so that any time the manual traverse mechanism is started with clutch 127, 129 engaged whereby valve 114 is held stationary, only a slight rotary motion of the manual wheel 121 will be required to admit fluid and start the table traversing movement under manual control.

When lever 102 and valves 90 and 180 are in position for a manually controlled table traverse movement, a manual rotation of the traverse wheel 124 in a counterclockwise direction serves to move the outer rotary valve member 115 in a counterclockwise direction so that the passage 152 in the outer valve member 115 approaches the V-port 151 (Fig. 7) which allows passage of fluid from pipe 190, through port 132, groove 133, passage 150, V-port 151, passage 154 and longitudinal passage 155, past the valve 156 (Fig. 9), and out through the pipe 159 into the cylinder chamber 70 at the right-hand end of the cylinder 50 to cause the piston 51 and table 35 to move toward the left. As the table starts moving toward the left, the rack bar 139 rotates the gear 138, also in a counterclockwise direction (as viewed from the front of the machine base) to cause a counterclockwise movement of the inner valve member 114 so that the V-port 151 tends to close the passage 152. In other words, when the outer valve member 115 is started rotating in a counterclockwise direction and fluid is admitted to start the table movement, the table movement rotates the inner valve member 114 in the same direction. Thus the inner valve member 114 tends to catch up with the outer valve member 115 and in this manner the speed of rotation of the manually operable traverse wheel 124 will determine the speed of the manually controlled traverse of the table.

Similarly, if the manually operable traverse wheel 124 is turned in a clockwise direction (looking from the front of the machine), a clockwise movement is transmitted to the outer valve member 115 so that the passage 141a in the outer valve member tends to approach and uncover a V-port 140a in the inner valve and member 114. When the passage 141a opens the V-port 140a, fluid under pressure is admitted through the annular groove 141 in the periphery of the outer valve member 115, through the passage 142, the valve 143, the port 144, and the pipe 145, into the cylinder chamber 71 at the left-hand end of cylinder 50 to cause the piston 51 and table 35 to move toward the right (Fig. 4). Movement of the table 35 toward the right operates through the rack bar 139 to rotate the gear 138 in a clockwise direction which in turn rotates the inner valve member 114 also in a clockwise direction so that the V-port 140a tends to move in the same direction as the passage 141a or, in other words, the inner valve member 114 rotates so as to catch up with the rotation of the outer valve member 115. In this manner, the speed of rotation of the manually operable traverse wheel 124 will govern the speed of manual traverse of the table 35 toward the right.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. A hand traverse apron for a grinding machine having a longitudinally movable table, a rack bar depending therefrom comprising a housing, a rotatable shaft journaled therein, a gear on said shaft which is arranged to mesh with the table rack, a valve member rotatably supported on said shaft, said valve member being operatively connected with a source of fluid under pressure, a clutch between said shaft and valve member whereby said shaft may be connected to rotate said valve member, means including fluid pressure connections within said valve to actuate said clutch, a second valve member surrounding the first valve member and rotatably supported thereon, and means including a manually operable hand wheel and gearing to rotate said second valve member relative to the first valve member, said second valve member being provided with ports and passages to convey fluid under pressure from the first valve member to either end of a table cylinder depending upon the direction of rotation of the hand wheel.

2. In a grinding machine having a longitudinally traversable table and a rack bar thereon and a piston and cylinder operatively connected therewith, a hand traverse apron therefor comprising a rotatable shaft, a gear on said shaft which is arranged to mesh with the table rack, a rotatable valve member surrounding said shaft and rotatably supported thereon, means including a clutch to connect said shaft with said valve member to rotate the valve member, a spring normally to hold said clutch disengaged, a source of fluid pressure operatively connected with passages in said valve member, said fluid pressure within said valve member serving to engage said clutch, a second valve member surrounding and rotatably supported on the first valve member, said second valve member being arranged to receive fluid under pressure from the first valve member and convey it in either one of two directions to either end of said table cylinder depending upon its direction of rotation, and means including a manually operable hand wheel to rotate said second valve member, said parts being arranged so that the rate of rotation of the manually operable hand wheel determines the rate of traversing movement of the grinding machine table.

3. A manually operable table traverse mechanism for a grinding machine having a longitudinally reciprocable table, a rack bar depending from said table, a fluid pressure system including a piston and cylinder operatively connected to traverse said table longitudinally, a fluid pressure pump, and a hand traverse apron comprising a rotatable shaft having a gear meshing with said rack, a valve member rotatably supported on said shaft, a clutch between said shaft and said valve member whereby the valve member may be rotated by movement of said shaft when the table is traversed, fluid pressure connections between said pump and said valve member, fluid pressure means within said valve automatically to actuate said clutch, a second valve member surrounding said first valve member and rotatably supported thereby, said second valve member being connected to admit fluid under pressure to either end of said cylinder, said valve members having ports and passages which may be successively brought into alignment to admit fluid under pressure either to one end or the other end of said cylinder, a manually operable hand traverse wheel, and gearing connecting said wheel with said outer valve member whereby rotation of the hand wheel serves to open one set of ports between the inner and outer valve members to admit fluid under pressure to traverse the table in one direction, said second valve being connected through the shaft and gear with the table rack so that it is rotated in the same direction as the outer valve member when the table starts traversing to catch up with the movement of the manually rotated outer valve member whereby the speed of rotation of the manually operable traverse wheel determines the traversing speed of the table.

4. In a grinding machine having a longitudinally reciprocable table, means including a piston and cylinder operatively connected to reciprocate said table, a fluid pressure system including a pump and a table actuated reversing valve, a manually operable stop and start valve in said system to control the stopping and starting of the table reciprocation, and a manually operable traverse apron comprising a valve member which is operatively connected to be actuated by the traversing movement of the table, a second valve member associated with the first valve member, a manually operable traverse wheel to actuate said second valve member, said valve members having ports and passages arranged so that the speed of rotation of the manually operable hand wheel governs the speed of the manually controlled traverse of said table, and a control valve actuated by and in timed relation with the stop and start valve to admit fluid under pressure either to the table actuated reversing valve or to the manually operable traverse apron valve.

5. In a grinding machine having a longitudinally reciprocable table, means including a piston and cylinder operatively connected to reciprocate said table, a fluid pressure system including a pump and a table actuated reversing valve, a manually operable start and stop valve in said system to control the stopping and starting of the table reciprocation, and a manually operable traverse apron comprising a rotatable valve member which is operatively connected to be rotated by the traversing movement of the table, a second rotatable valve member associated with the first valve member, a manually operable traverse wheel to rotate said second valve member, said valve members having ports and passages arranged so that the speed of rotation of the manually operable hand wheel governs the speed of the manually controlled traverse of said table, and a control valve actuated by and in timed relation with said stop and start valve to admit fluid under pressure either to the table actuated reversing valve or to the manually operable traverse apron valve.

6. In a grinding machine having a longitudinally reciprocable table, means including a piston and cylinder operatively connected to reciprocate said table, a fluid pressure system including a pump and a table actuated reversing valve, a manually operable stop and start valve to control the exhaust of fluid from said system to stop and start the table reciprocation, and a manually operable table traverse apron comprising a rotatable valve member which is operatively connected to be rotated by the table traversing movement, a second rotary valve member surrounding the first valve member and rotatably supported thereby, a manually operable traverse wheel to rotate said second valve member, said valve member having ports and passages arranged so that the speed of rotation of the manually operable hand wheel governs the speed of the manually controlled traverse of said table, and a control valve actuated simultaneously with the stop and start valve to admit fluid under pressure either to the table actuated reversing valve or to the manually operable traverse apron valve.

JOSEPH R. WHITTLES.